United States Patent [19]

Inoue

[11] 3,945,563
[45] Mar. 23, 1976

[54] TRANSFER PINION CARRIER PLATE FOR ODOMETERS

[75] Inventor: Shiro Inoue, Ageo, Japan

[73] Assignee: Kabushiki Kaishya Inoue Seisakushyo, Ageo, Japan

[22] Filed: Jan. 10, 1975

[21] Appl. No.: 540,217

[52] U.S. Cl. ............... 235/96; 235/95 R; 235/139 R
[51] Int. Cl.² ..................... G01C 22/00; G06C 7/10
[58] Field of Search ......... 235/96, 95 R, 1 C, 139 R

[56]           References Cited
            UNITED STATES PATENTS

| | | | |
|---|---|---|---|
| 2,004,881 | 6/1935 | Slye | 235/96 |
| 2,656,107 | 10/1953 | Vogler | 235/96 |
| 3,432,096 | 3/1969 | Powell | 235/96 |
| 3,756,506 | 9/1973 | Inoue | 235/95 R |

Primary Examiner—Stephen J. Tomsky
Attorney, Agent, or Firm—Gifford, Chandler & Sheridan

[57] ABSTRACT

This invention has for its object to do away with the defects of the prevailing transfer pinion carrier plates made of metal. In the process of manufacturing a metallic carrier plate, a separately prepared small shaft for supporting the transfer pinion should be planted vertically to the plate with care. Further, as the transfer pinion is only partially surrounded by the plate, a gap is always formed between each pair of the figure wheels of the completed odometer. Such a gap not only admits the intrusion of dust and dirt into the odometer but invites the destruction of the transfer pinion permitting the insertion of a sharp tool through the gap inadvertently or by a malicious person. All such defects may be effectively avoided by producing carrier plates with plastic materials in accordance with the present invention.

1 Claim, 5 Drawing Figures

TRANSFER PINION CARRIER PLATE FOR ODOMETERS

BACKGROUND OF THE INVENTION

The transfer pinion carrier plates positioned between each pair of figure wheels for odometers have previously been made of metal. In the process of preparing such a carrier plate, it has been a laborsome operation to attach a separately prepared small metal shaft for supporting the transfer pinion vertically to the plate. Further, as the transfer pinion is only partially surrounded by the plate, a gap has been always formed between each pair of the figure wheels of the finished odometer. Such a gap not only admits the intrusion of dust and dirt into the odometer but also invites the destruction of the transfer pinion by the insertion of a sharp tool through the gap inadvertently or by a malicious person.

This invention has for its object to do away with such defects by producing the transfer pinion carrier plate with plastic material.

The invention will be understood from the following description.

Figure 1:
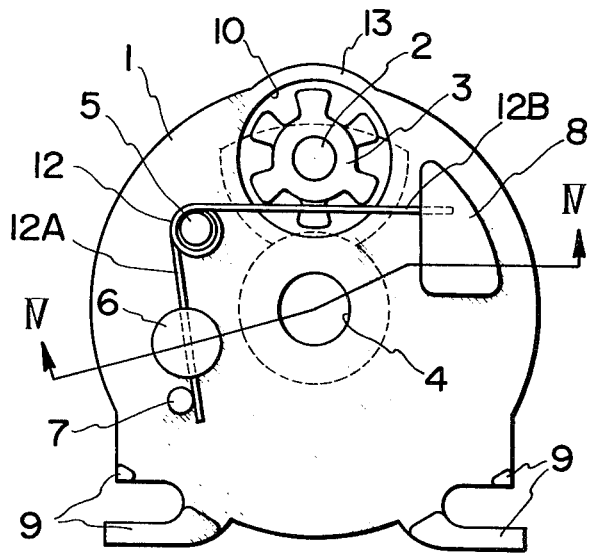
FIG. 1 is a front view of the transfer pinion carrier plate according to this invention.

DESCRIPTION OF A PREFERRED EMBODIMENT OF THE INVENTION 1 is the transfer pinion carrier plate made of plastic material such as polyvinyl acetal, polyvinyl butyral, polyvinyl formal or the like. The plate 1 has a central opening 4 surrounding the odometer shaft and a circular opening 10 surrounding the transfer pinion 3. Behind the circular opening 10, a pocket 11 is formed. Within the pocket 11, the transfer pinion 3 is rotatively mounted on a shaft 2 which is formed as one body with the pocket wall.

Figure 5:
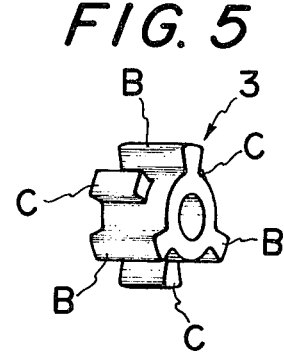
FIG. 5 is a perspective view of the transfer pinion.

As can best be seen in FIG. 5, the transfer pinion 3 is provided with three long teeth B and three short teeth C arranged alternately to each other.

Figure 3:
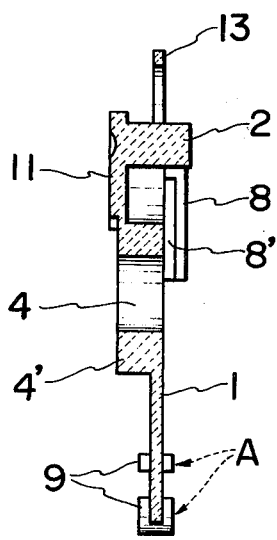
FIG. 3 is the sectional view along the line 3—3 of FIG. 2 in which the transfer pinion and coil spring are omitted.
Figure 2:
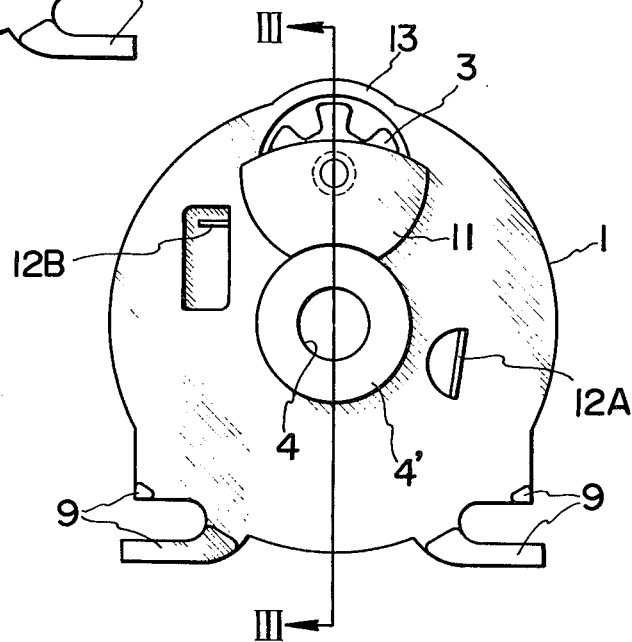
FIG. 2 is a rear view of the same.

Referring again to FIG. 1, a coil spring 12 is supported by a stud 5. The horizontal leg 12B of the coil spring 12 engages yieldably with two long teeth of the transfer pinion and its end is inserted in the split 8' formed under an embossed portion 8 while the vertical leg 12A of the coil spring passes through the slit 6' formed under an embossed portion 6 and its end engages with a stopper 7. 9 are slotted arms for holding the carrier plate from rotation. The arms 9 may be made thicker as shown at A in FIG. 3 than the other portion to strengthen them.

Figure 4:
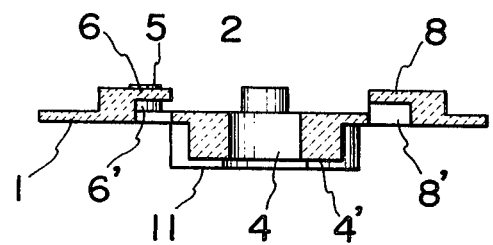
FIG. 4 is the sectional view along the line 4—4 of FIG. 1.

As is clearly shown in FIG. 4, the central opening 4 is provided with a thick tubular portion 4' projecting rearwardly.

Different from the hitherto known metallic carrier plates, the carrier plate 1 of the present invention is provided with an arcuate bridge portion 13 above the transfer pinion 3 so as to obliterate the gap which has been usually formed by the known metallic carrier plate between each pair of figure wheels of the odometer.

As is clear from the above, according to this invention, the shaft for supporting the transfer pinion is formed as one body with the carrier plate and the transfer pinion is totally surrounded by the carrier plate. Further, the thick projecting tubular portion of the central opening permits dispensing with the ordinarily necessary spacer ring.

I claim:

1. A transfer pinion carrier plate for an odometer having a plurality of figure wheels rotatably mounted on an odometer shaft and spaced apart from each other at a predetermined distance, said carrier plate being constructed of plastic material and having a central opening surrounding the odometer shaft, a transfer pinion, a circular opening surrounding the transfer pinion, a pocket formed integrally with said carrier plate behind said circular opening having a shaft integral therewith for supporting the transfer pinion, a coil spring yieldably engaging with said transfer pinion, a thick tubular portion projecting rearwardly behind the central opening, slotted arms for holding the carrier plate from rotation and an arcuate bridge portion integral with said carrier plate, wherein said bridge portion extends over said transfer pinion between adjacent figure wheels.

* * * * *